United States Patent
Lee

(10) Patent No.: US 7,377,550 B2
(45) Date of Patent: May 27, 2008

(54) RETRACTOR FIXING STRUCTURE OF REAR SEATBELT SYSTEM

(75) Inventor: Ho-Chul Lee, Anyang-si (KR)

(73) Assignee: Kia Motors Corporation, Seoul (KR)

( * ) Notice: Subject to any disclaimer, the term of this patent is extended or adjusted under 35 U.S.C. 154(b) by 249 days.

(21) Appl. No.: 11/159,589

(22) Filed: Jun. 22, 2005

(65) Prior Publication Data

US 2006/0001253 A1   Jan. 5, 2006

(30) Foreign Application Priority Data

Jun. 23, 2004   (KR)   ............... 10-2004-0047135

(51) Int. Cl.
*B60R 22/08*   (2006.01)

(52) U.S. Cl. ............... 280/803; 280/807; 280/808; 296/37.7

(58) Field of Classification Search ............... 280/807, 280/808, 803, 802, 804; 296/203.04, 37.7, 296/37.8
See application file for complete search history.

(56) References Cited

U.S. PATENT DOCUMENTS

| | | | | |
|---|---|---|---|---|
| 4,915,413 A | * | 4/1990 | Meyer | 280/801.1 |
| 5,253,896 A | * | 10/1993 | Verbeski | 280/808 |
| 5,647,611 A | * | 7/1997 | Boyd et al. | 280/801.1 |
| 5,855,407 A | * | 1/1999 | Fukuda | 296/203.03 |
| 6,086,100 A | * | 7/2000 | Corporon et al. | 280/808 |
| 6,126,230 A | * | 10/2000 | Ikeda et al. | 296/187.05 |
| 6,234,529 B1 | * | 5/2001 | Ellison et al. | 280/808 |
| 6,773,048 B1 | * | 8/2004 | Freeman | 296/63 |
| 6,880,857 B2 | * | 4/2005 | Schwarz et al. | 280/801.1 |
| 6,918,628 B2 | * | 7/2005 | Eipper et al. | 296/187.11 |
| 7,249,797 B2 | * | 7/2007 | Wolkersdorfer et al. | 296/203.04 |
| 2006/0001253 A1 | * | 1/2006 | Lee | 280/807 |

FOREIGN PATENT DOCUMENTS

DE   698-01-137 T2   11/2001

* cited by examiner

*Primary Examiner*—Eric Culbreth
*Assistant Examiner*—Karen Jane J. Amores
(74) *Attorney, Agent, or Firm*—Morgan Lewis & Bockius LLP

(57) ABSTRACT

A retractor of a three-point rear seatbelt system is affixed to a rear roof rail without excessively protruding out at the bottom of the rear roof rail. Such an arrangement provides sufficient rear vision of the vehicle and strengthens the rigidity of the rear roof rail where the retractor is fixed in order to withstand heavy loads associated with seat belt systems.

2 Claims, 5 Drawing Sheets

RETRACTOR FIXING STRUCTURE OF REAR SEATBELT SYSTEM

CROSS-REFERENCE TO RELATED APPLICATIONS

The present application is based on, and claims priority from, Korean Application Serial Number 10-2004-0047135, filed on Jun. 23, 2004, the disclosure of which is hereby incorporated by reference herein in its entirety.

FIELD OF THE INVENTION

The present invention relates to a structure that fixes a retractor of a rear seatbelt system. More particularly, the present invention relates to a structure that fixes the retractor to a rear roof rail of the vehicle body.

BACKGROUND OF THE INVENTION

Generally, a three-point seatbelt has a retractor at the upper end thereof. The middle and lower end portions of the seatbelt are attached to both sides of a rear-seat passenger.

The retractor of the three-point seatbelt for a rear middle-seat passenger is preferably disposed at a rear roof rail. The rear roof rail installed with the retractor should firmly be formed for withstanding heavy load, and the retractor should appropriately be placed without interrupting the rear vision of the vehicle.

SUMMARY OF THE INVENTION

Embodiments of the present invention are provided to fix a retractor of a three-point rear seatbelt system to the rear roof rail without an excessive protrusion at the bottom of the rear roof rail, thereby obtaining a sufficient rear vision of the vehicle. Further, the rigidity of the rear roof rail where the retractor is fixed is strengthened for withstanding heavy load.

A retractor fixing structure of a rear seatbelt system includes a rear lower roof rail formed with a retractor insertion hole. A rear upper roof rail is coupled onto the rear lower roof rail and forms a space between the rear lower roof rail and rear upper roof nail to thereby consist a rear roof rail. A retractor is inserted and fixed in the retractor insertion hole.

DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
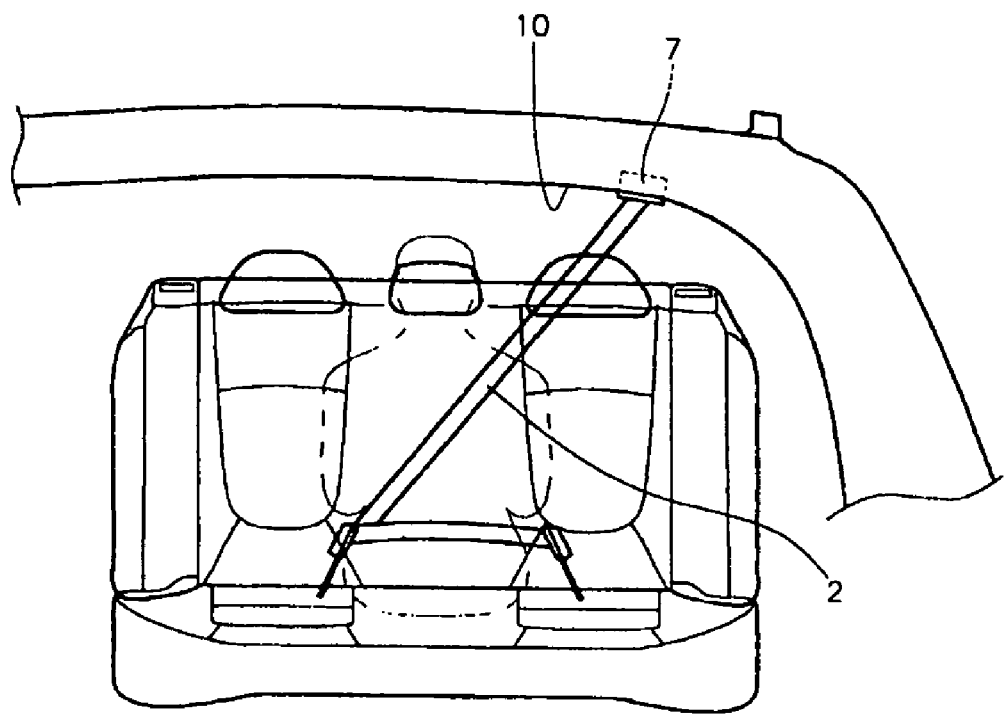
FIG. 1 illustrates a retractor fixing structure of a rear seatbelt system according to an embodiment of the present invention.

FIG. 1 schematically illustrates a three-point rear seatbelt system according to a preferred embodiment of the present invention. A seatbelt 2 is connected at the upper end thereof to a retractor 7 that is fixed at a rear roof rail 10.

Figure 2:
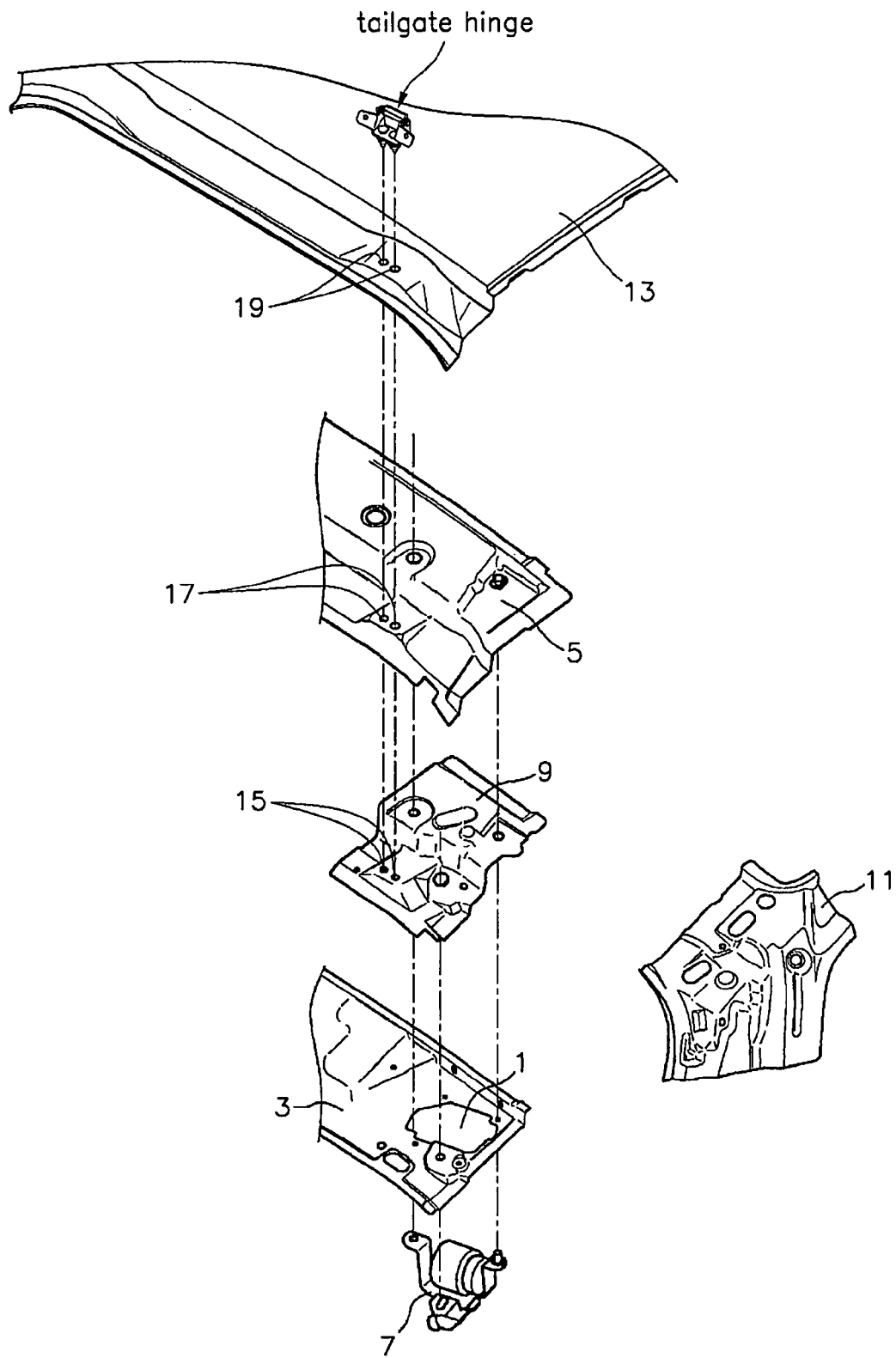
FIG. 2 is a perspective view of a disassembly where a retractor is fixed.
Figure 3:
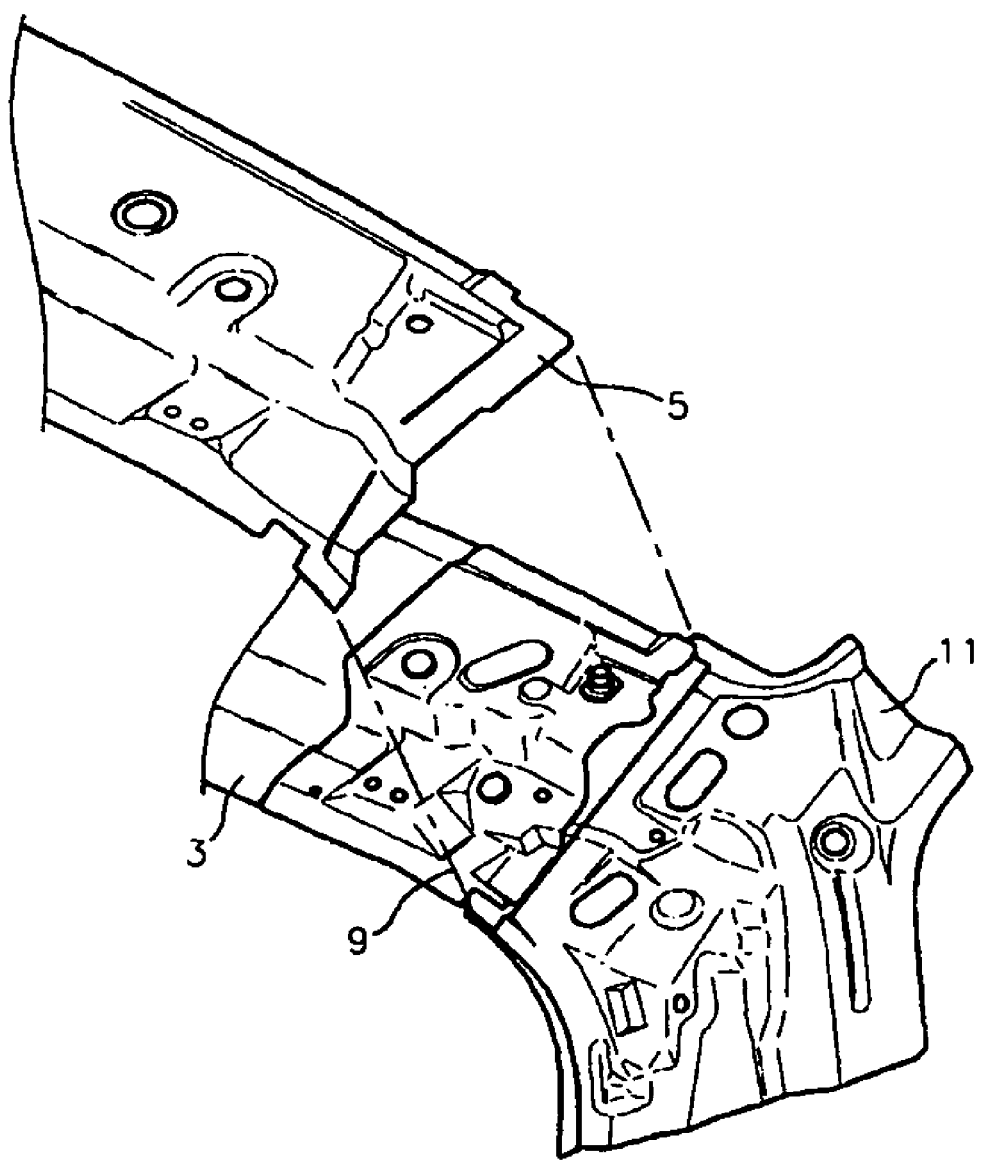
FIG. 3 illustrates a rear upper roof rail being coupled onto a rear lower roof rail and reinforcement.
Figure 4:
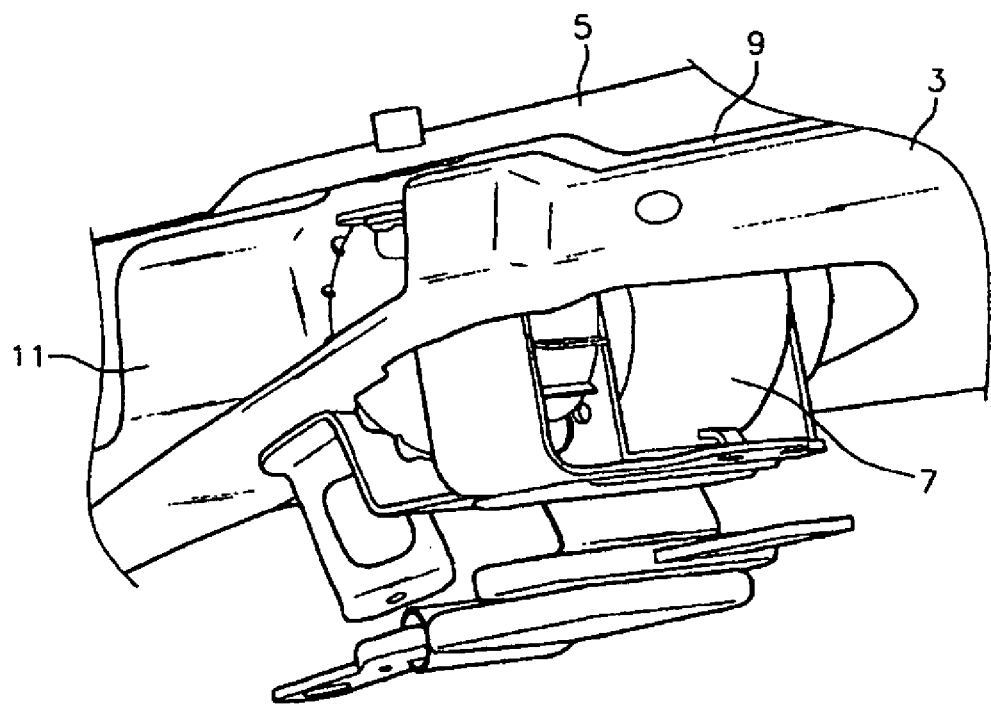
FIG. 4 is a side view of FIG. 3.

With reference to FIGS. 2 to 4, the present embodiment includes a rear lower roof nail 3 formed with a retractor insertion hole 1. A rear upper roof rail 5 is coupled onto rear lower roof rail 3 and forms a space between rear lower roof rail 3 and rear upper roof rail 5 to thereby consist rear roof rail 10. Retractor 7 is inserted and fixed in retractor insertion hole 1.

Figure 5:
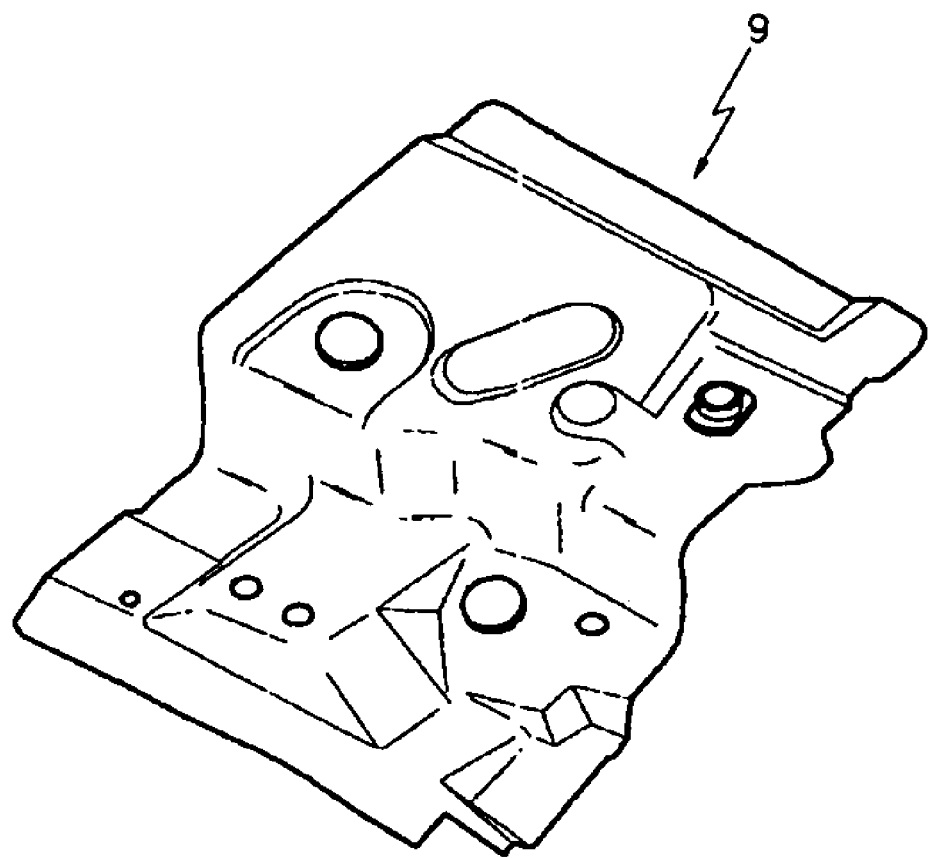
FIG. 5 is a detailed view of the reinforcement.

A reinforcement 9 is disposed between rear lower roof rail 3 and rear upper roof rail 5, and retractor 7 is directly coupled to reinforcement 9 through retractor insertion hole 1 (see FIG. 5).

As illustrated in FIG. 3, reinforcement 9 is welded onto the upper surface of rear lower roof rail 3, and retractor 7 is coupled to the lower surface of reinforcement 9. A D-pillar reinforcing member 11 is coupled, by way of welding, to a lateral side of rear lower roof rail 3. Rear upper roof rail 5 is coupled, by way of welding, onto the upper surfaces of rear lower roof rail 3 and reinforcement 9. A roof panel 13 is coupled to the upper surface of rear upper roof rail 5.

Reinforcement 9 has an upwardly bent shape at the middle portion thereof so as to place retractor 7, through retractor insertion hole 1, in a space formed between reinforcement 9 and rear lower roof rail 3.

Reinforcement 9 is further formed with first hinge mounting holes 15 through which a tailgate hinge is mounted. Rear upper roof rail 5 is formed with second hinge mounting holes 17 to communicate with first hinge mounting holes 15. Rear upper roof rail 5 is coupled at the upper portion thereof with roof panel 13 having third hinge mounting holes 19 that communicate with the first and second hinge mounting holes.

Thus, the tailgate hinges shown in FIG. 2 are coupled to the vehicle body via coupling bolts that pass through first, second and third hinge mounting holes, consecutively. Therefore, reinforcement 9 may tightly fix the tailgate hinges as well as retractor 7.

As apparent from the foregoing, there is an advantage in that the retractor and tailgate are tightly affixed to the vehicle with only a few number of components. Further, the retractor is mounted in a rear lower roof rail through a retractor insertion hole, thus restricting or preventing the retractor from protruding downwardly from the rear lower roof rail. This avoids the retractor from interrupting the rear vision of the vehicle.

What is claimed is:

1. A retractor fixing structure of a rear seatbelt system, comprising:
   a rear lower roof rail formed with a retractor insertion hole;
   a rear upper roof rail coupled within said rear lower roof rail to form a rear main roof rail with a space between said rear lower roof rail and rear upper roof rail;
   a retractor inserted and fixed in said retractor insertion hole and thereby mounted to said rear main roof rail; and
   a reinforcement positioned between said rear lower roof rail and rear upper roof rail and being coupled with said retractor;

wherein said reinforcement is formed with first hinge mounting holes through which a tailgate hinge can be mounted, said rear upper roof rail is formed with second hinge mounting holes to communicate with said first hinge mounting holes, and said rear upper roof rail is coupled at an upper portion thereof with a roof panel having third hinge mounting holes that communicate with said first and second hinge mounting holes.

2. The structure as defined in claim 1, wherein said reinforcement has an upwardly bent shape at a middle portion thereof to thereby place said retractor, through said retractor insertion hole, in a space formed between said reinforcement and rear lower roof rail.

* * * * *